(No Model.)
2 Sheets—Sheet 1.

S. F. SHELBOURNE.
SUBTERRANEAN ELECTRIC CABLE.

No. 275,425.
Patented Apr. 10, 1883.

Witnesses.
John Buckler
Geo. L. Weed

Inventor.
Sidney F. Shelbourne (No Model.) 2 Sheets—Sheet 2.
S. F. SHELBOURNE.
SUBTERRANEAN ELECTRIC CABLE.
No. 275,425. Patented Apr. 10, 1883.
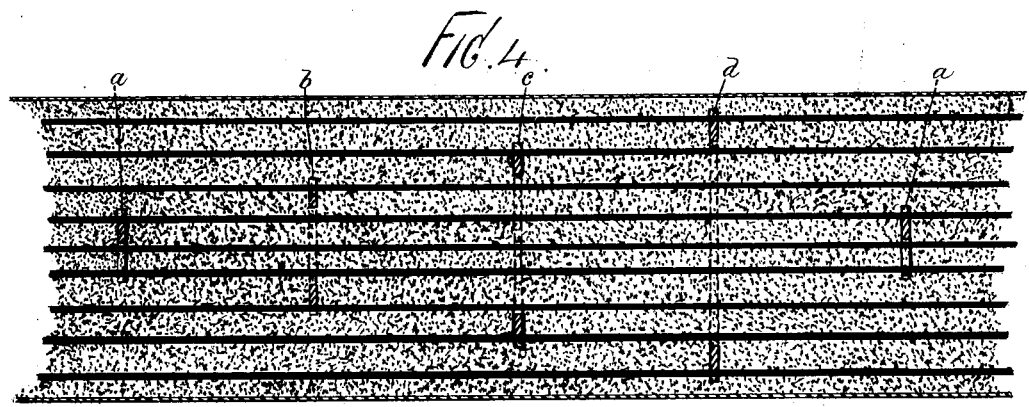
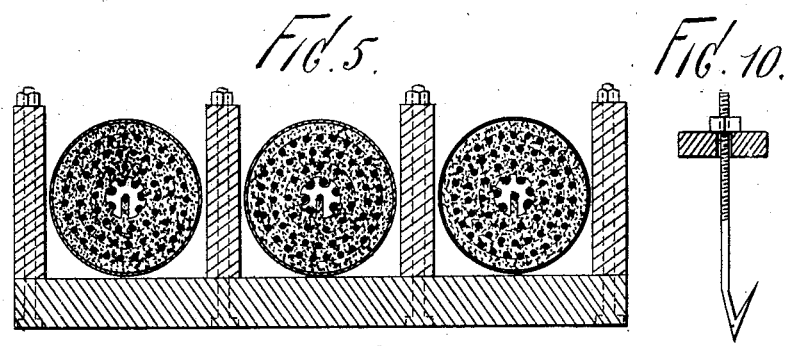
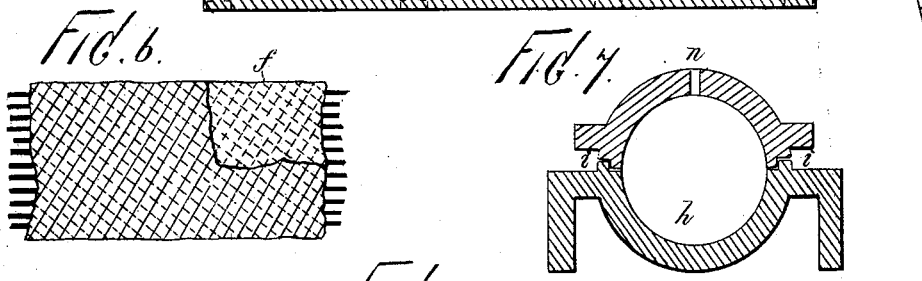
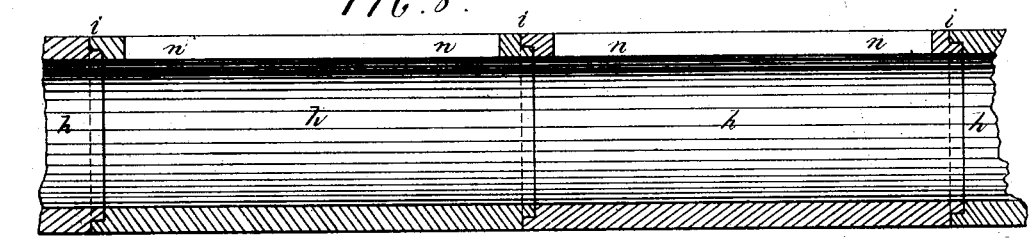
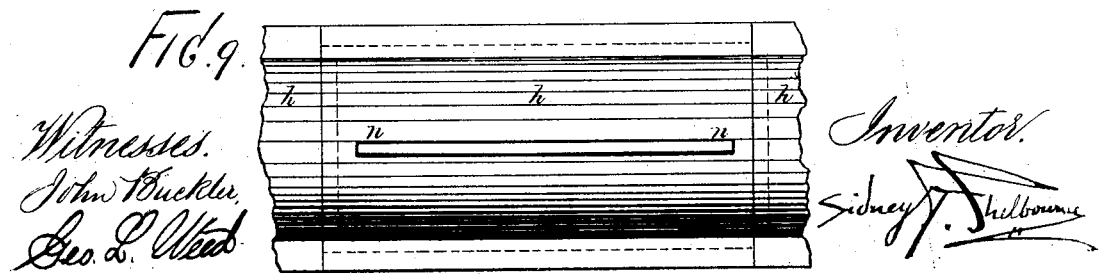
Witnesses.
John Buckler
Geo. L. Weed
Inventor.
Sidney F. Shelbourne

UNITED STATES PATENT OFFICE.

SIDNEY F. SHELBOURNE, OF NEW YORK, N. Y.

SUBTERRANEAN ELECTRIC CABLE.

SPECIFICATION forming part of Letters Patent No. 275,425, dated April 10, 1883.

Application filed September 21, 1882. (No model.)

*To all whom it may concern:*

Be it known that I, SIDNEY F. SHELBOURNE, a citizen of the United States, residing in the city of New York, in the State of New York, have invented a new and useful Improvement in Cables for the Conduction of Electricity under Ground; and I do hereby declare that the following is a full, clear, and exact description of the invention, which will enable others skilled in the art to which it appertains to make and use the same.

Heretofore subterranean cables have usually been laid in tubes of iron or other material with screw-thread or flange-joints, and the cables themselves have been composed of wires insulated from each other by gutta-percha, which is perishable, or by means of cotton covering for each single wire, and saturated with some more perfect insulating material, in which case the wires are closely adjacent to each other, separated only by such thin cotton covering with its saturating material; and while such cables, when composed of copper wires, have realized a considerable compactness and flexibility, yet the very near contiguity of the wires has given rise to the objection that induction has been greatly increased thereby, and the wires themselves, to attain compactness in the cables, being of copper and of fine gage, have been subject to accidental breakage, or to destruction by being melted by powerful and unusual charges of electricity, as in case of lightning. Besides, such cables are usually drawn into considerable lengths of the inclosing iron tubing, and are liable to have their insulation destroyed by the abrasion of the covering of the wires against the rough interior of the tubes during the process of inclosure, or by the unequal expansion and contraction due to heat and cold when completed and in operation.

The object of my invention is to attain a construction of cable by which the several objections just enumerated may be entirely avoided, while at the same time any single part of the cable which may be damaged through extraordinary causes may be easily reached and repaired in detail without removing the whole length of the cable from its protecting inclosure under the pavement or soil. The particular means and methods by which these objects are attained are illustrated in the accompanying drawings, to which reference is made, and in which—

Figure 1:
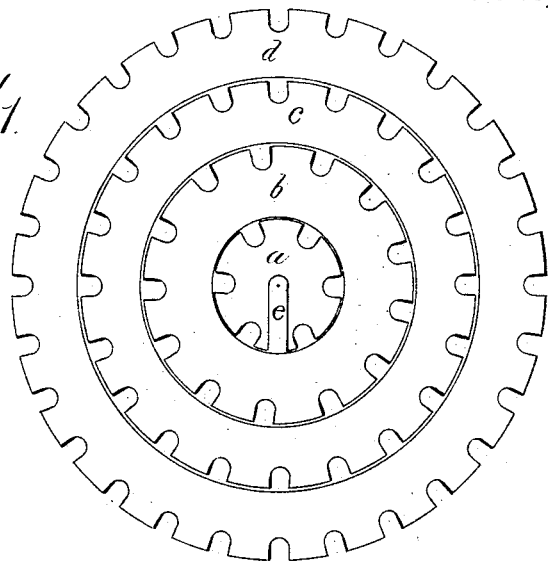
Figure 2:
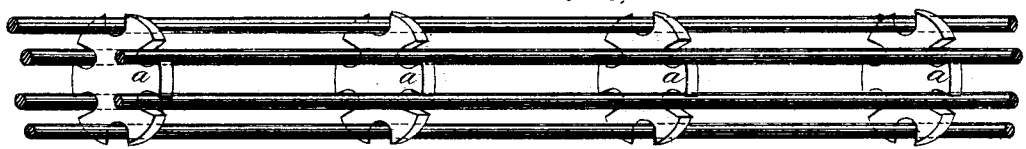
Figure 3:
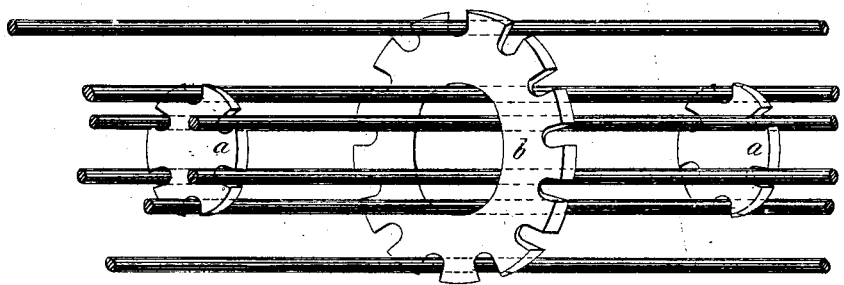

Figure 1 represents several notched rings or templets, upon which the wires are successively supported and separated in the construction of the cable. Fig. 2 is a perspective of the core or inner portion of the cable being laid upon the smallest or first series of the rings or templets. Fig. 3 gives a perspective view of the second step, or process of enlarging the cable, by passing the second series of notched rings or templets over the core of the cable laid upon the first series, and upon this second series supporting an additional train or circle of wires. Fig. 4 is a vertical section of the completed cable after the several notched rings shown in Fig. 1 have been successively passed over the part of the cable supported by the next smaller ones, and the notches of each supplied with their respective wires. Fig. 4 shows, also in section, the filling, establishing, and permanently insulating material poured among, around, and over the wires of the cable, together with the jute or other character of wrapping or covering for the same. There is also shown in this figure, in section, the position of the several notched rings with reference to each other, and in their relation to the continuity of the filling and insulating composition. Fig. 5 represents a cross-section of a box or supporting-inclosure for three such completed cables, also shown in section through the smallest disk or templet $a$, and resting in their places, each separated from the other by a partition of the box. Fig. 6 represents in perspective the double winding or wrapping of the cable with bandages of jute or other material, and at $f$ a portion served with a waterproofing of asphalt-pitch, coal-tar, or other resinous preparation. Figs. 7, 8, and 9 are respectively a cross-section, a vertical section, and a plan view of a series of metal molds, within which the skeleton cable is centrally suspended to be clothed upon with the filling and insulating compound. Fig. 10 represents a small hook, by a number of which the skeleton cable formed of the wires is centrally supported within the series of molds through the pouring-slots $n\ n\ n$ shown in Figs. 7 and 9.

The usual and practicable method of constructing and laying the cable, as illustrated in the several figures of the drawings, will be as follows:

When it is to be laid under the pavements of cities its construction will be in lengths of two blocks or more, where at the intersection of cross-streets will be sunk test and receiving and distributing boxes for the cables, with covers at the surface of the pavement. Into these boxes the several lengths of the cables will terminate, so as to allow the wires of each to be connected with those of any other in the same direction or in a transverse direction, and so as to permit at any time the wires of each division of the cables to be tested for insulation or continuity. For the distance between any two of these test-boxes a trench will be dug of suitable width and depth, and the box shown in Fig. 5 for inclosing and protecting the cables will be constructed and leveled upon the sand at the bottom of it. Across the upright portions of this box will be laid temporarily slats or pieces of wood supporting the wires, in number sufficient to construct each cable, eventually to be dropped into the inclosing and protecting trough beneath it. The cable construction then commences by laying a wire in each of the notches of the smallest disks or templets $a\ a\ a\ a$, Fig. 2, and also a wire through the center of these disks by means of the slot $e$, Fig. 1, which, for clearness of illustration, is not shown in Fig. 2. The wires are retained in their places in the notches by winding the assembled number of them in each successive ring or templet spirally with fine strong twine at each step of the construction from the core outward. When the disks or templets $a\ a\ a\ a$, which are usually placed about a foot apart from each other, have been supplied with their quota of wires, and these are fastened in their places, a sufficient number of the rings or templets $b$ are passed over the core formed in $a\ a\ a\ a$, and again this second series of rings $b$ are supplied in their notches with their appropriate quota of wires, and these being wound spirally, as were those in $a\ a\ a\ a$, the same operation is repeated with the series of rings $c$ and with those of $d$ to whatever size in diameter or in the number of wires it may be desired to construct the cables. Usually, however, it will be found convenient to limit the cables to the size of rings or templets shown in Fig. 1, so that the completed cables may be four and a half to five inches in diameter and contain from sixty-eight to one hundred wires in each. These rings $a\ b\ c\ d$ are preferably made of hard rubber one-eighth of an inch in thickness, but may be made of Siemens's malleable glass or any other suitable non-conducting or good insulating material of sufficient thickness and strength to sustain the wires until they are firmly supported and held in place by the solid insulating compound to be poured among them and over them.

The skeleton cable having been constructed as explained, the sectional and jointed molds shown in Figs. 7, 8, and 9 are then made to inclose it for a length of fifteen to twenty feet at a time, and hooks, as shown in Fig. 10, are inserted into the molds through the slots $n\ n\ n$, Figs. 7 and 9, used for pouring the insulating material, and catching one of the wires in the series of rings C, immediately under $d$, Fig. 1, the cable is suspended longitudinally in the center of the molds by adjusting the handles of the hooks upon the tops of the molds by means of the threads and nuts upon the stems of the hooks.

The molds are made one-half an inch or more larger in internal diameter than the skeleton cable to be insulated, and when suspended therein and the insulating material poured through the slots $n\ n$, Figs. 7 and 9, it incloses and surrounds the entire number of wires with a thickness of insulation corresponding to the spaces between the circumference of the wires and the interior diameter of the mold.

The insulating material may be of any known non-conducting solid substance capable of manipulation under the conditions imposed, and which has enough flexibility and tensility to resist cracking by any slight bending of the cable; but I very much prefer to use for this purpose the composition described in my application for a patent dated September 18, 1882.

The insulating composition having set in the molds, and having clothed upon the cable with its own uniform substance, the molds are removed and the cable further insulated and protected by double spiral wrappings of jute bandages, as shown in Fig. 6, each wrapping being in the opposite spiral direction to the other, and each in turn cemented to the cable and to the other by a coating of hard and water-proof resin or varnish. The cable being thus completed, the wooden strips are removed from under it and it drops into its resting-place in the box beneath, ready to be connected at the test-boxes for operation.

The molds are provided in alternate sets for use, and each set, until it is applied to the cable, is kept chilled in an ice-bath in order to cause the rapid cooling of the surface of the insulating material next in contact with the interior surface of the molds when poured within them. In order to prevent adhesion between the hardening composition of the cable and the interior of the molds, the molding-surfaces of the latter are rubbed with a sponge containing glycerine, which renders such adhesion impossible.

It will be observed that the one open end of the series of molds is stopped by the already completed filling of the cable, while the other open end is temporarily shut by a handful of cotton-wool, filling the spaces between and around the wires.

The rings or templets $b\ c\ d$, when made of hard rubber, instead of being slipped over the ends of the successive formations of the cable, may be divided at one point of their circumference and sprung over the interior skeletons by their lateral elasticity from the point of division.

In placing the templets *a b c d* to form the skeleton cable, they are so adjusted that no two of them come opposite to or over each other in a diametrical direction, so as to avoid breaking the continuity of the insulating compound at any one point in the length of the cable, except by the diametrical thickness of a single ring at a time, as shown at *a*, *b*, *c*, *d*, and *a*, Fig. 4.

Of course it is apparent that covers or not may be fitted to the cable-troughs, as may be found desirable in the situations where used.

Having thus fully described my invention, what I desire to claim and secure by Letters Patent of the United States is—

1. A cable for conducting electricity underground in which the wires are arranged in circumferential series, in combination with annular templets or supports, such templets or supports being presented in such combination and arrangement, so that those of each larger series pass over those of the next smaller series, and at the same time lock or secure the wires supported on the templets of the smaller series in their containing notches, as herein described.

2. In electric cables for underground telegraphy, in which the wires are insulated in a body or mass of insulating material, the annular templets or supports within the skeleton cable, all of them being substantially concentric to the same longitudinal axis, but each in a different cross-section of the cable, so that the longitudinal continuity of insulating material may not be broken diametrically, except by a single templet at any one point, as shown.

3. In electric conductors for underground telegraphy, the following combination of elements, to wit: annular templets, the wires or conductors supported thereon arranged in circumferential spaces and successive concentric series, and the plastic and flexible filling or inlation, the whole forming a flexible and insulated cable, as herein set forth.

SIDNEY F. SHELBOURNE.

Witnesses:
 THOS. AYLING, Jr.,
 CHAS. RILEY.